March 16, 1954    T. N. JONES, JR    2,671,979
EEL HOLDER
Filed Jan. 22, 1952
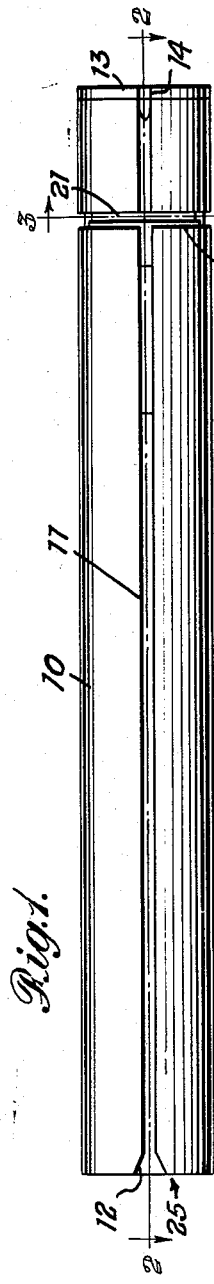
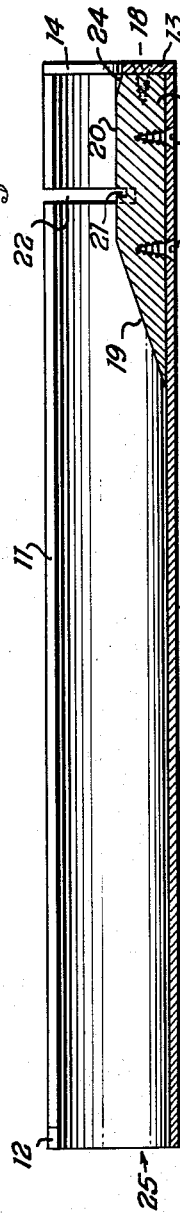
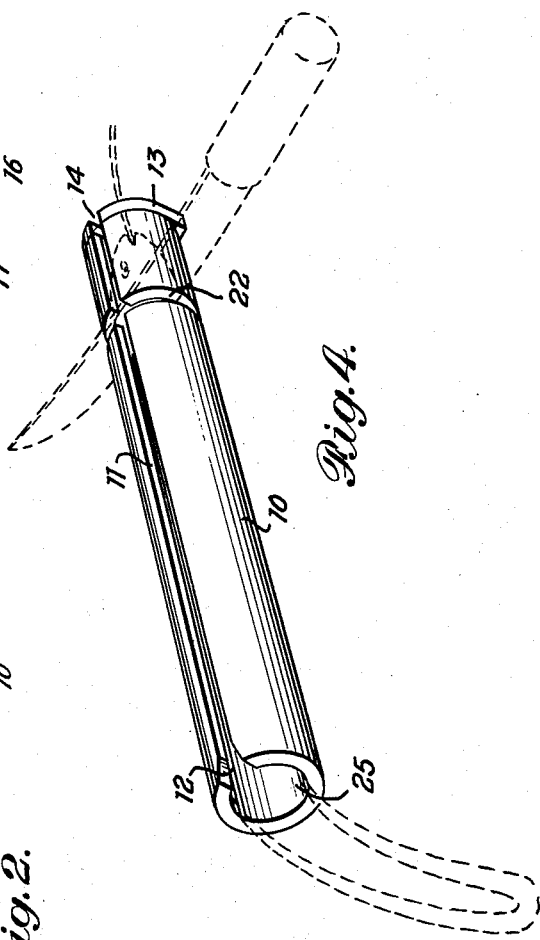
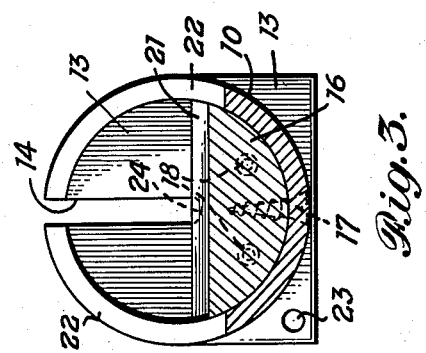
INVENTOR
T. Norman Jones, Jr.
BY    Munsow H. Lane
ATTORNEY Patented Mar. 16, 1954

2,671,979

UNITED STATES PATENT OFFICE 2,671,979

EEL HOLDER

Thomas Norman Jones, Jr., Richmond, Va.

Application January 22, 1952, Serial No. 267,611

3 Claims. (Cl. 43—53.5)

The invention relates to an improved device for securely holding an eel or the like when caught on a hook and line, in such position that it may be readily beheaded and disposed of in a clean, orderly and humane fashion.

My improved holder comprises essentially a tubular body member having a longitudinal slot extending from end to end to permit the line to be drawn therethrough, a slotted plate or closure at one end thereof to limit forward movement of the eel, an inclined block at the closure end of the tubular body member to position the head of the eel for decapitation, the tubular body member being also slotted transversely at a suitable distance to the rear of the closure plate to permit insertion of a knife or the like for decapitating the eel.

Various devices have been proposed for holding eels and the like to permit removal of a hook from the eel while alive. Such devices are in general relatively complicated and involve the use of moving parts. In contrast to such prior devices the present device aims only to hold the eel to prevent movement of its body while presenting the head portion to a block and slot to facilitate decapitation, and subsequent removal of the body from the severed head portion of the eel.

The primary objective of my device is not to assist the fisherman in the performance of a somewhat dental-like operation on a live eel to remove a foreign object from its mouth, but is intended for use by those who fish for fish—not eels. Such persons usually fish for pleasure or for table use, or both, and desire to use all of the time at their disposal on the fishing grounds, catching fish. When they are unfortunate enough to hook an eel they wish to get rid of it quickly and resume fishing for fish. My device enables such a fisherman to draw the eel through the tube to its intended position on the execution block in one end of the tube and to keep the head in such intended position by keeping the eel's mouth against the end plate while the eel is being beheaded. Following the beheading operation the eel's body is dropped out of the tube and the head is removed from the tube by retracing the fishing line through the longitudinal slot. The hook can then be removed from the inanimate head and fishing resumed. The shape and design of the block facilitates beheading. In short, my device enables the fisherman to quickly dispose of the eel and lose a minimum of fishing time, while avoiding the tangling of lines, etc., caused by the thrashing around of a live eel. My device has no springs or moving attachments and is designed for the sole purpose of speeding to its death any eel or other denizen of the water, having small girth and considerable length, which the size of the device in use will contain, and which may be caught by a hook and line fisherman. The holder is simple in design, has no moving parts to get out of order, can be washed with a minimum of effort, requires no oiling of parts, can be made out of many different materials, and in varying sizes to meet demand.

Among the distinctive features of my invention the following may be mentioned:

1. My improved holder simplifies removing the eel from the hook and conserves fishing time.

2. My invention makes contact with the eel's body and one's hands unnecessary.

3. The improved holder reduces likelihood of the hook catching in hand or clothing.

4. The size and length of the tube may be varied depending on length and size of eels to be caught. The holder may be made in several sizes, alike in all respects except as to length, diameter of tube, distance of cross slot from closed end, and possibly material to be used in construction.

5. The longitudinal slot in the tube and the cross slot near the closed end of the tube preferably have smooth edges to avoid cutting fishing lines, this being particularly important where a metal tube and plate are employed.

6. If desired the open end of the tube may be flared slightly to make the eel's entry easier.

7. The tapered block inside the tube is secured in position so as to keep it in place; the block may be made of soft wood, or other material, and is preferably provided with a cross slot or kerf to facilitate cutting off the eel's head.

8. My holder avoids tangling of fishing line and reduces loss of hooks and lines.

9. The holder may be dipped in the water and washed outside of the boat after the eel has been beheaded and the fishing line removed therefrom.

10. The lead or other weight attached to the line can be pulled through the slot or kept on outside of the tube, as desired.

11. The tube is made of material sufficiently thick to hold its shape and tough enough not to break easily.

12. No great skill or strength is required to handle eels when secured in the holder.

13. The holder includes no moving parts, cams, gears, or the like, to get out of order.

14. A kerf or notch in the wooden head rest enables the cutter blade to work more effectively.

15. A square cut base at closed end keeps the tube from rolling when laid down.

16. A hole near the outer edge of the cover over the closed end of the tube may be used in fastening or securing the knife to the device.

The invention will be more readily understood by reference to the accompanying drawing and the following detailed description.

In the drawing:

Fig. 1 is a top plan view of my improved holder;

Fig. 2 is a longitudinal vertical section thereof taken on line 2—2 of Fig. 1;

Fig. 3 is a transverse view on line 3—3 of Fig. 1; and

Fig. 4 is a perspective view illustrating the operation of the holder.

Referring to the drawing, my improved holder in its preferred form comprises an elongated tubular member 10, which may be formed of any suitable inexpensive material, as for example asphalt material, a suitable plastic such as "Bakelite," or of vulcanized fiber, wood, or a suitable corrosion resistant metal such as aluminum or galvanized iron.

The tube 10 is provided with a slot 11 extending longitudinally thereof from end to end, the slot being enlarged at one end 12 to facilitate entry of the line. At the forward end of the tube a closure plate 13 is provided, which is vertically slotted at 14, the slot 14 intersecting the longitudinal slot 11 in the tube 10. The base of plate 13 is flat to hold the tube in such position that the slot 11 is always at the top thereof.

In the lower portion of the forward end of the tube a decapitation block 16 is provided which may be secured to the tube by means of screws 17, 17 and to the front plate 13 by means of screws 18, 18. The block 16 is preferably tapered at its rear end 19 to serve as a guide for the head of the eel as it is drawn forwardly through the tube. The flat forward surface 20 of the block is preferably provided with a transverse slot or groove 21 which coacts with a transverse knife-receiving groove 22 in the tube 10 to facilitate beheading the eel. A hole 23 may be provided in the front plate 13 to permit attachment of a string for holding a knife to be used in beheading the eel. Preferably the block 20 is nicked at its front end as indicated at 24 to intersect the vertical slot 14 in the front plate to provide a guide for the fishing line.

It will be understood that the tube 10, front plate 13 and decapitation block 16 may be made of any suitable materials. In a satisfactory specific embodiment of the invention the tube has been made of asphaltic material, and the end piece 13 and decapitation block 16 of wood, but these materials may be varied without departing from the invention in its broadest aspects. Furthermore, while the parts are shown secured together by means of screws other fastening means may be employed.

The dimensions of the various parts may also be varied considerably from what is shown in the drawings without departing from the spirit of the invention. The position of the slot 22 and groove 21 with respect to the front plate should be sufficient so that the hook swallowed by the eel will be included with the head portion of the eel rather than with the body portion when the head is severed from the body. Generally when an eel takes the hook the part of the hook furthest from the mouth end will be not more than two and one-half inches from the end. The slot 22 and groove 21 are so arranged that a knife applied through the slot 22 will entirely miss the hook. The diameter of the tube 10 should be large enough to readily accommodate an eel of the largest size likely to be caught in a particular vicinity. If desired the entry end 25 may be flared to facilitate the operation of drawing the eel into the holder.

The operation of the device, as will be largely apparent from the foregoing description, is as follows:

When an eel has been hooked and brought to the edge of the boat the section of fishing line nearest the eel is passed through the slot 11 in the tube 10, the open end of the tube being placed nearest to the eel. The bottom of the open end of the tube nearest the eel is then placed under the eel's head, and the fishing line beyond the closed end of the tube pulled on until much of the eel is inside of and its head is at the forward or closed end of the tube. The line being pulled on is then placed under the tube opposite the longitudinally slotted section where it is held by the left hand, which is also engaged in holding the tube now containing the head end and a substantial portion if not all of the eel. A sharp knife is then thrust through the cross slot 22, decapitating the eel, as it will rest for a short distance from the end of its head or mouth, on the wooden block (headrest) inside of the tube and secured firmly to it. The wood block is preferably tapered from a third to a half of the diameter of the tube at its closed end, to a feather edge, about five inches inside of and toward the open end of the tube. On this block the eel's head end rests. The tube is then upended and the eel's body dropped out of it. The eel's head containing the hook is removed through the open end of the tube, the fishing line retracing its entry path, clearing the tube. The hook can then be removed from the eel's head, rebaited and fishing can be resumed.

The invention has been described in detail for the purpose of illustration but it will be obvious that numerous modifications and variations may be resorted to without departing from the spirit of the invention.

I claim:

1. A unitary eel holder devoid of moving parts and adapted to restrain the movements of a hooked eel confined therein so as to permit decapitation of the eel at a point at the rear of the hook, said holder comprising a tubular body portion having a longitudinal slot therethrough to permit passage of a fishing line, a front plate adapted to limit the forward movement of the eel having a line receiving slot intersecting the longitudinal slot, said body having a transverse knife receiving slot intersecting the longitudinal slot at a point spaced rearwardly from the front plate, to permit decapitation of the eel while its nose portion is held against the front plate, and a decapitation block within the forward end of the tubular body portion, said block having an inclined rear portion providing a guide for the head of the eel, and a raised front portion having a transverse slot therein.

2. A unitary eel holder devoid of moving parts and adapted to restrain the movements of a hooked eel confined therein so as to permit decapitation of the eel at a point at the rear of the hook, said holder comprising a tubular body portion having a longitudinal slot therethrough to permit passage of a fishing line, a front plate adapted to limit the forward movement of the eel having a line receiving slot intersecting the longitudinal slot, said body having a transverse knife receiving slot intersecting the longitudinal slot at a point spaced rearwardly from the front plate, to permit decapitation of the eel while its nose portion is held against the front plate, and a decapitation block within the forward end of the tubular body portion, said block having a line guiding groove near the forward end thereof.

3. A unitary eel holder devoid of moving parts and adapted to restrain the movements of a hooked eel confined therein so as to permit decapitation of the eel, said holder comprising a tubular body portion having a line receiving slot extending lengthwise through the wall thereof, a front plate having a line receiving slot portion intersecting the longitudinal slot, said body portion having a transverse slot intersecting the longitudinal slot at a point spaced rearwardly from the front plate to permit application of a knife for beheading the eel, and a decapitation block within the forward end of the tubular body having an inclined guide portion leading thereto whereby movement of the head of the eel is restrained during decapitation.

THOMAS NORMAN JONES, Jr.

References Cited in the file of this patent

UNITED STATES PATENTS

| Number | Name | Date |
|---|---|---|
| 1,515,014 | Downs | Nov. 11, 1924 |
| 2,091,893 | Tillinghast | Aug. 31, 1937 |
| 2,531,551 | Brecht et al. | Nov. 28, 1950 |
| 2,547,592 | Morris | Apr. 3, 1951 |

FOREIGN PATENTS

| Number | Country | Date |
|---|---|---|
| 10,424 | Great Britain | 1891 |